United States Patent
Carpenter et al.

(10) Patent No.: US 7,446,518 B2
(45) Date of Patent: Nov. 4, 2008

(54) METHOD AND APPARATUS FOR ENHANCING VOLTAGE REGULATOR TRANSIENT RESPONSE

(75) Inventors: Brian Carpenter, Cary, NC (US); Rhys Philbrick, Glasgow (GB)

(73) Assignee: Semtech Corporation, Morrisville, NC (US)

( * ) Notice: Subject to any disclaimer, the term of this patent is extended or adjusted under 35 U.S.C. 154(b) by 432 days.

(21) Appl. No.: 11/074,483

(22) Filed: Mar. 8, 2005

(65) Prior Publication Data
US 2005/0194952 A1     Sep. 8, 2005

Related U.S. Application Data

(60) Provisional application No. 60/551,209, filed on Mar. 8, 2004.

(51) Int. Cl.
G05F 1/40 (2006.01)
G05F 1/56 (2006.01)
(52) U.S. Cl. .................. 323/285; 323/282; 323/288
(58) Field of Classification Search .......... 323/285, 323/284, 288, 268, 271, 282
See application file for complete search history.

(56) References Cited

U.S. PATENT DOCUMENTS

| | | | |
|---|---|---|---|
| 6,683,441 B2 * | 1/2004 | Schiff et al. | 323/222 |
| 6,801,030 B2 * | 10/2004 | Tai et al. | 324/117 R |
| 7,000,122 B2 * | 2/2006 | Zafarana et al. | 713/300 |

\* cited by examiner

Primary Examiner—Matthew V Nguyen
(74) Attorney, Agent, or Firm—Coats & Bennett, P.L.L.C.

(57) ABSTRACT

A voltage regulator improves its transient adjustment response by amplifying error in its regulation feedback control path, including any droop-related error. Amplifying the error speeds up the voltage regulator's response to load changes and droop control adjustments by exaggerating the feedback error. Thus, in at least one embodiment, a droop control circuit imparts a droop-related offset between an output feedback signal and a reference signal responsive to a droop adjustment signal, and a response-enhancing amplifier circuit amplifies that offset for input to an error sensing circuit of a regulation control circuit. The gain and frequency response of the response-enhancing amplifier circuit may be set as a function one or more regulation stability criteria, and the response-enhancing method may be adapted to a variety of voltage regulator topologies. Such topologies include, but are not limited to, PWM regulators and hysteretic regulators.

15 Claims, 6 Drawing Sheets

METHOD AND APPARATUS FOR ENHANCING VOLTAGE REGULATOR TRANSIENT RESPONSE

RELATED APPLICATIONS

This application claims priority under 35 U.S.C. § 119(e) from U.S. Provisional Application Ser. No. 60/551,209 filed on Mar. 8, 2004. That provisional application is expressly incorporated in its entirety by reference herein.

BACKGROUND OF THE INVENTION

The present invention generally relates to voltage regulation, and particularly relates to improving the transient response of voltage regulators, including those regulators having output voltage droop control.

The term "voltage regulator" generally connotes a device or circuit that provides a regulated output voltage to a load. Such devices are sometimes also referred to as "power controllers." Neither term conveys the complexity and sophistication of contemporary voltage regulators, which find use in a wide range of demanding applications.

Providing the operating voltage to a modern, high-performance microprocessor core stands as a prime example of such applications. Microprocessors tax the abilities of even the best voltage regulators to maintain accurate output voltage regulation. For example, at least some processors require different supply voltages corresponding to different modes of operation. Lower supply voltages commonly correspond to lower power (and lower performance) modes of operation, while higher supply voltages generally are required for higher or maximum performance modes of operation. Thus, a voltage regulator intended for operation as a microprocessor core voltage regulator may need to regulate accurately to any one of several specified output voltages.

Moreover, microprocessor current requirements generally have a wide dynamic range. For example, a given microprocessor might draw 500 mA to 1 A while operating in a low-power mode, but might have peak current draws over 40 A in higher performance modes. Worse still, the changes in current draw, i.e., the load change, may be so rapid that it is difficult for the voltage regulator to prevent voltage undershoot or overshoot on the regulated voltage output.

Indeed, specialized techniques have developed to combat the undershoot/overshoot problems. For example, some voltage regulators incorporate a droop control mechanism that "droops" the output voltage as a function of current load. As a simple example, the nominal operating voltage of a given microprocessor might be specified as 1.8 V, but the actual permissible range of supply voltage may be 1.5 V to 2.2 V. A voltage regulator with droop control might be configured to regulate the output voltage to a value in the higher end of the range under light current loads, and then regulate down toward the lower end of the permissible supply voltage range as the current load increases.

Thus, the voltage regulator uses load current feedback, or some related variable, as a control input for actively positioning the regulated output voltage. Positioning the output voltage at a relatively high level within the permissible supply voltage range under light load conditions tends to prevent voltage undershoot arising from step change increases in load current. Similarly, positioning the output voltage at a relatively low level within the permissible supply voltage range under heavy load conditions tends to prevent voltage overshoot arising from step change decreases in load current.

The need to sense load current stands as one potentially undesirable aspect of active voltage positioning. For example, some voltage regulators require the addition of a current sense resistor to their outputs as a means of providing feedback to their droop control circuits. Resistance-based current sensing can be undesirable because it requires the addition of at least one resistor to the Bill of Materials (BOM). Oftentimes that resistor is large and expensive, given the high currents that are involved. Further, resistance-based current sensing unavoidably wastes some amount of power, which is always frowned on in power-sensitive mobile processor applications.

Thus, designers have developed alternative, essentially "lossless" approaches to sensing load or load-related currents. For example, in switch-mode voltage regulators, voltage droop control may be based on sensing switch currents in the inductor-switching transistors, or current sensing may exploit the dc winding resistance (DCR) of the switched inductor. These lossless approaches to sensing load current potentially have sensing time constants that are large with respect to the voltage regulator's switching period. As such, the relatively slow response of the lossless current sensing can affect the overall load transient response of the regulator.

SUMMARY OF THE INVENTION

In one embodiment, a voltage regulator implements a method of improving its overall transient response, including its response to droop control adjustments corresponding to desired amounts of droop in the regulated output voltage. The method comprises generating a regulated output voltage based on feedback control that senses error between an output feedback signal and a reference signal and adjusts the output voltage to reduce said error, and amplifying the error for input to the feedback control, such that the feedback control is made responsive to an amplified error between the output feedback and reference signals.

In one or more embodiments voltage regulation as taught herein, a response-enhancing amplifier circuit is disposed in the feedback path of the voltage regulator, such that the regulation control circuit generates its regulation error signal based on receiving an amplified difference (error) between the regulation control signals, which may comprise an output feedback signal and a reference signal. Further, the response-enhancing amplifier circuit may be configured such that the error amplified by it includes not only regulation errors associated changing load conditions, imperfections in regulation control, etc., but also droop-related errors introduced by a droop-control circuit used to impart desired amounts of voltage droop in the regulated output voltage. More broadly, the response-enhancing circuit may be configured to amplify any changes imparted by any active voltage positioning circuitry included in the voltage regulator, such that the improvement of the regulator's transient response includes improvement of its responses to changes in the load, and to changes in the active voltage positioning control.

With the above configuration, one method of improving transient response comprises generating the regulated output voltage based on amplifying a regulation error between an output feedback signal and a reference signal, such that a regulation control circuit of the regulator responds to the amplified difference, which includes the amplification of any droop-related offset between the regulation signals. In such embodiments, a feedback control senses regulation error between the output feedback signal and a reference signal and adjusts the output voltage to reduce said error. The overall transient response of the voltage regulator, which includes its droop control adjustment response, is improved by amplifying the regulation error for input to the feedback control. The feedback control may comprise a regulation control circuit.

Thus in one embodiment, a voltage regulator comprises a regulation control circuit configured to regulate an output voltage based on reducing error between an output feedback signal and a reference signal, a droop control circuit configured to introduce a droop-related error between the output feedback signal and the reference signal, and a response-enhancing amplifier circuit configured to improve a transient response of the voltage regulator by amplifying the regulation error, including any droop adjustment-related error.

The voltage regulator may be implemented as a large-scale integrated circuit device, and it may include additional circuitry, such as timing circuits, clock signal generators, reset control circuits, thermal protection circuits, reference signal generators, etc. Further, it should be understood that the voltage regulator can be configured according to a variety of regulator topologies. By way of non-limiting examples, the voltage regulator may be configured as a PWM regulator, or as a hysteretic regulator. In any case, the regulator can be configured for essentially any output configuration, such as buck conversion, boost conversion, buck-boost conversion, etc. Thus, any particular output configurations illustrated herein should be understood as non-limiting examples.

In at least one embodiment of the above voltage regulator, the droop control circuit imparts a droop-related error by combining a droop signal with a first one of the output feedback and reference signals, e.g., the apparent value of the output feedback signal or the reference signal is changed according to an amount of voltage droop desired for the output signal. In turn, the response-enhancing amplifier circuit that amplifies the difference between the changed first one of the output feedback and reference signals and a remaining second one of output feedback and reference signals. That amplified difference represents an exaggerated regulation error, including an exaggerated droop-related offset error, and the exaggerated regulation error is input to the regulation control circuit, such that regulation of the output voltage is made responsive to the amplified version of regulation error, including any droop-related offset.

DETAILED DESCRIPTION OF THE INVENTION

Figure 1:
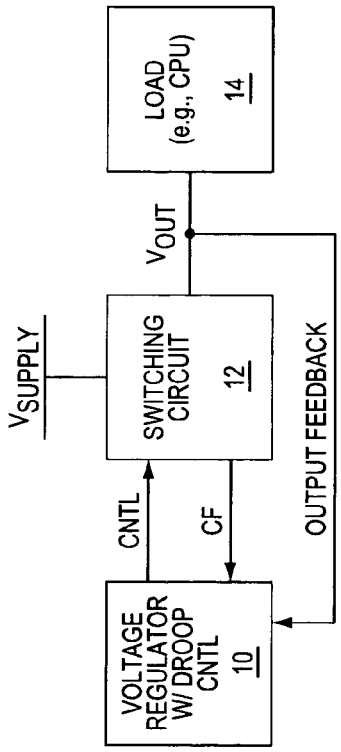
FIG. 1 is a block diagram of an embodiment of a voltage regulator having enhanced transient response.

FIG. 1 is a block diagram of a (switch-mode) voltage regulator 10 that is configured to generate a regulated output voltage ($V_{OUT}$) based on controlling a switching circuit 12. The regulated output voltage serves as an operating supply voltage for a load 14, which may be a microprocessor. The regulator 10 incorporates voltage droop control, allowing it to position the regulated output voltage within an allowable range of the load, according to load current. More generally, the regulator 10 incorporates active voltage positioning to position its output voltage at a desired level.

Figure 2:
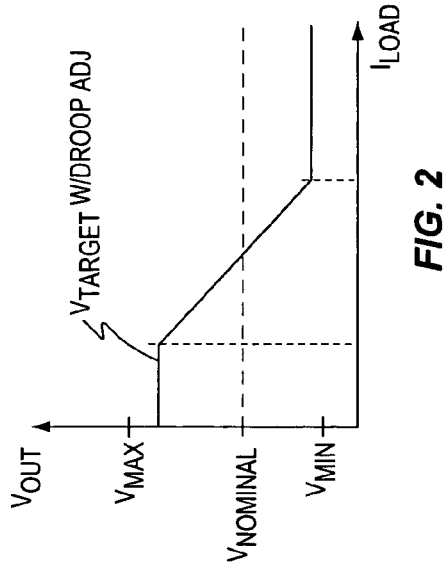
FIG. 2 is a diagram of output voltage droop control implemented by an embodiment of the voltage regulator of FIG. 1.

By way of non-limiting example, FIG. 2 illustrates one embodiment of droop control that may be implemented by the control logic of the regulator 10. According to the illustration, the regulator 10 droops the regulated output voltage between upper and lower regulation limits as a function of load current. Of course, those skilled in the art will appreciate that the regulator 10 can be configured with any one or more of a wide variety of voltage positioning/droop control methodologies.

Of more interest than the particular droop control method adopted is the regulator's incorporation of one or more functional elements to improve its overall transient response to load changes, which, in one or more embodiments, includes improving its response droop control adjustments. It should be noted that, broadly, the transient response of the voltage regulator 10 is improved by amplifying (exaggerating) the regulation error seen in the regulator's feedback path, and that benefits in transient response are gained independent of whether the regulator 10 includes a droop control—i.e., the transient response to load changes is improved by amplifying the regulation error seen in the feedback path of the regulator 10 arising from such changes. If droop control is included, droop-related errors also may be amplified, to gain concomitant improvements in the regulator's response to droop control adjustments.

One aspect of improving the response of the regulator 10 to load changes and/or to droop control adjustments is decreasing the settling time of its regulated output voltage responsive to changes in regulation error, i.e., responsive to the error (differences) between the regulation control signals that drive its feedback control. Such error arises dynamically, due to changing load currents and/or due to active voltage positioning changes, e.g., droop control adjustments.

Figure 3:
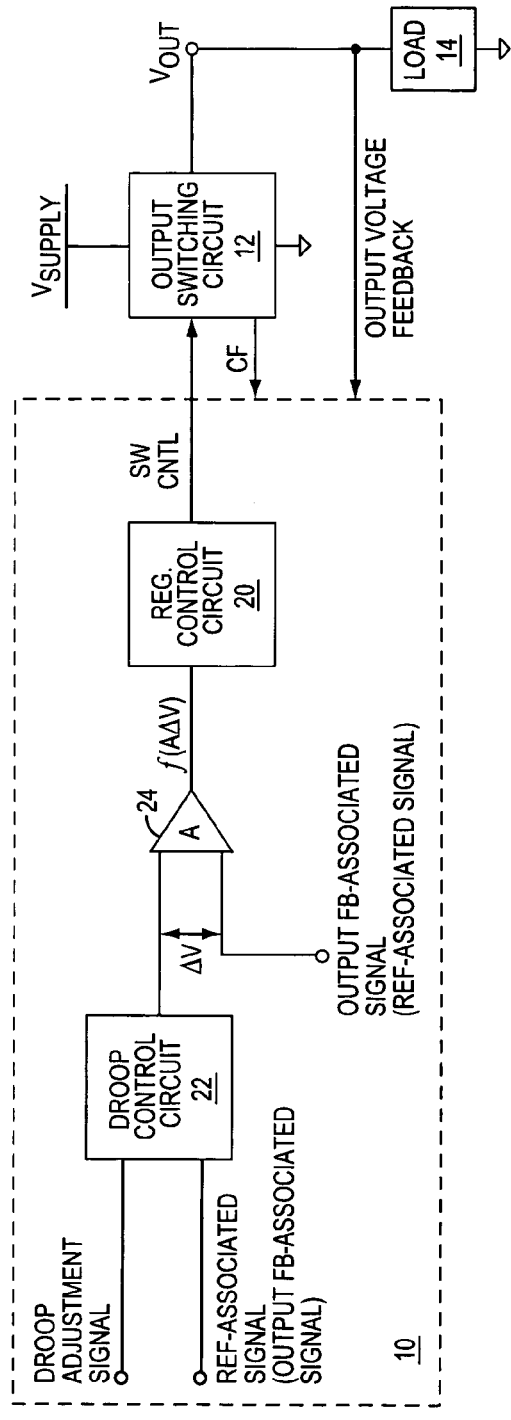
FIG. 3 is a diagram of circuit details for one embodiment of a voltage regulator with enhanced transient response.

FIG. 3 illustrates a configuration of the regulator 10 that provides improved transient response, wherein the illustrated embodiment of the regulator 10 comprises a regulation control circuit 20, a droop control circuit 22, and a response-enhancing amplifier circuit 24. The regulator 10 may be configured to receive load current feedback (CF) and output voltage feedback. Such feedback may be used to support output regulation control, droop control, and overall transient response improvement.

For example, in one embodiment, the regulator 10 generates the regulated output voltage based on feedback control that senses error between an output feedback signal and a reference signal, and adjusts the output voltage to reduce said error. Such feedback control is incorporated in a feedback path, which includes the regulation control circuit 20. The regulation control circuit 20 generally includes some type of error sensing circuit that generates an error signal for regulation control based on differences between the reference signal, which is associated with the desired output voltage, and the output feedback signal, which is associated with the actual output voltage of the regulator 10.

Further, in at least one embodiment, the droop control circuit 22 is configured to impart droop adjustments of the regulated output voltage responsive to a droop adjustment signal, based on introducing droop-related error between the output feedback signal and the reference signal. With that general method of droop control, the response-enhancing amplifier circuit 24 can be configured to improve the transient response of the regulator 10 by amplifying the error between the two regulation signals for input to the feedback control, i.e., for input to the error sensing circuit of the regulation control circuit 20.

In other words, the error sensing circuit of the regulation control circuit controls the regulated output voltage responsive to error between the two regulation signals, and the response-enhancing amplifier circuit enhances the control response of that error sensing circuit by providing it with an amplified version of that error. Unless otherwise qualified herein, then, the "regulation error" amplified by the response-enhancing amplifier circuit 24 represents an overall regulation error, including output control errors, sensing errors, etc., and any error arising by operation of the droop control circuit 22. Thus, the transient response of the regulation control circuit 20 is improved by exaggerating the regulation error that it "sees" in the feedback path via operation of the response-enhancing amplifier circuit 24.

With particular respect to droop-related error, it should be noted that such error may be introduced by offsetting the output feedback signal from the reference signal by an amount corresponding to the amount of voltage droop desired for the output voltage. Such an offset may be introduced by combining a droop signal from the droop control circuit 22 with the output feedback signal or the reference signal, or otherwise by using the droop signal to introduce a signal offset somewhere in the feedback path of the regulation control circuit 20, such that the droop adjustment imparts an apparent offset between the regulation control signals used to sense error in the regulated output voltage.

Figure 4:
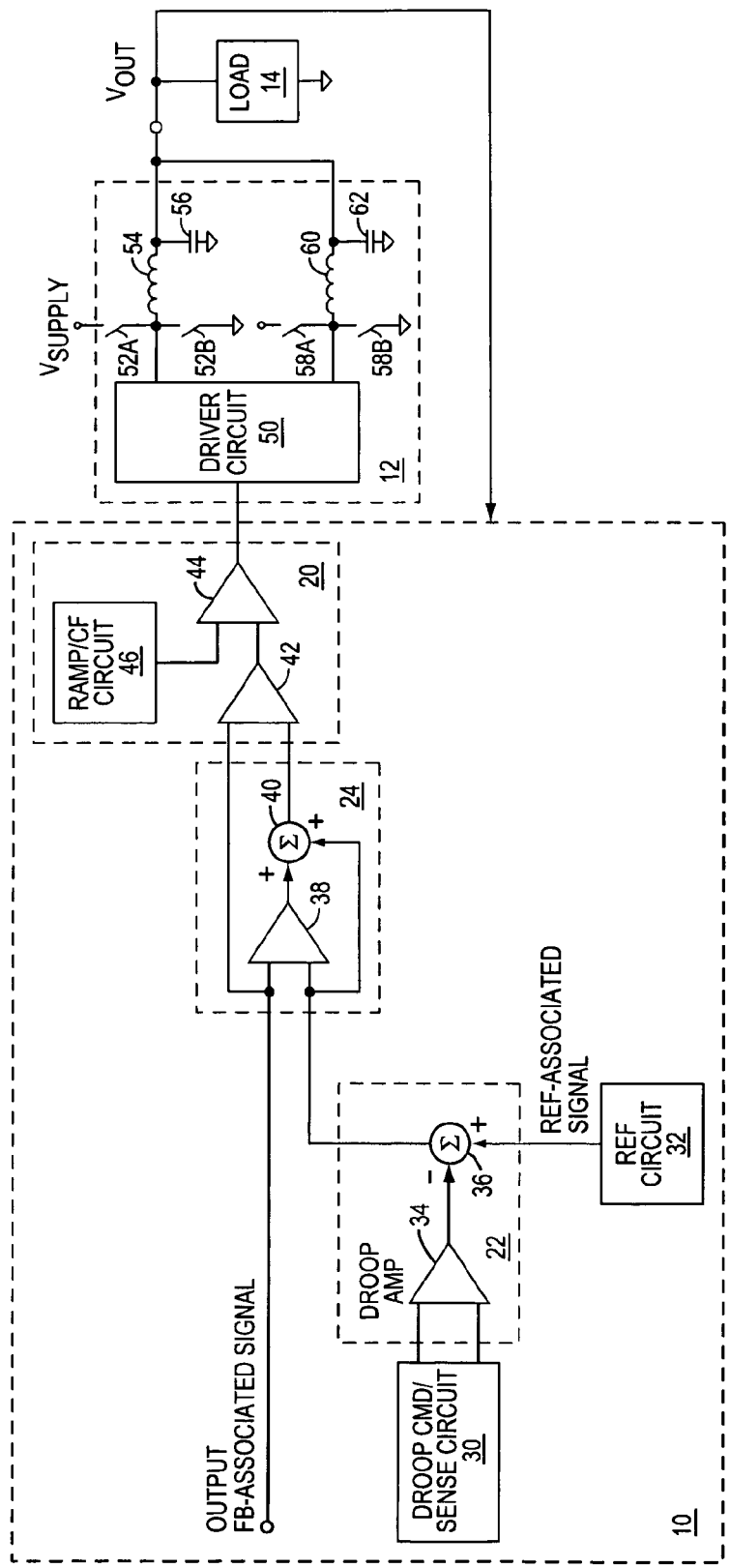
FIGS. 4-6 are diagrams of PWM-based voltage regulators with enhanced transient response.

With the above points in mind, FIG. 4 illustrates circuit details for an embodiment of the regulator 10, wherein the regulator 10 includes a droop control command/sense circuit 30, and a reference circuit 32. Note that the regulator 10 actually may include a number of circuit elements not illustrated herein for reasons of clarity and focus. While not germane to understanding droop control response enhancement, those skilled in the art will appreciate that the regulator 10 commonly will include reset control/startup circuits, thermal protection circuits, timing and clock generation circuits, analog-to-digital and/or digital-to-analog conversion circuits, etc., and may include command and control interface circuits to support communication with supervisory control circuits.

In any case, the regulation control circuit 20 is configured to regulate the output voltage provided by the regulator 10, based on reducing the regulation error between an output feedback signal and a reference signal. The droop control circuit 22 is configured to introduce a droop-related error between the output feedback signal and the reference signal, and the response-enhancing amplifier circuit 24 is configured to improve the transient response of the voltage regulator by amplifying the regulation error, including any such droop-related error.

More particularly, as is seen in the illustration, the droop control circuit 22 is configured to introduce the droop-related error by adjusting a droop offset between the output feedback and reference signals according to an amount of voltage droop desired for the output voltage, as determined by the input from the droop command/sense circuit 30 to the droop control circuit 22.

The illustrated embodiment of the droop control circuit 22 comprises an amplifier 34 that is configured to generate a droop signal responsive to the droop adjustment input, and further comprises a combining circuit 36, e.g., a summer, that is configured to add or subtract the droop signal from a first one of the output feedback and reference signals. In the illustration, the droop control circuit 22 operates on the reference signal, but it could just as easily operate on the output feedback signal. (That configuration is illustrated in the otherwise identical circuit embodiment shown in FIG. 5.) The combining circuit 36 subtracts the droop signal from the reference signal, thus lowering the reference signal by an amount corresponding to the voltage droop desired for the output voltage. In other words, the droop control circuit 22 introduces droop-related error (offset) between the regulation control signals (output feedback and reference) in response to the droop control adjustment signal output from the droop command/sense circuit 30.

In turn, the response-enhancing amplifier circuit 24 improves the overall transient response of the regulator 10 by amplifying that offset, i.e., by exaggerating the regulation error, including any error introduced by a droop control adjustment. The illustrated embodiment of the response-enhancing amplifier circuit 24 accomplishes this improvement by amplifying the regulation error (i.e., the difference between the droop-adjusted reference signal, as output from the combining circuit 36 of the droop control circuit 22, and the output feedback signal).

In the illustrated embodiment, the response-enhancing amplifier circuit 24 comprises an amplifier 38 and a combining circuit 40. The amplifier 38 is configured to generate a first error signal for input to the regulation control circuit 20, based on amplifying a difference between the output feedback and reference signals, wherein that difference includes any droop-related offset imparted to one of those signals by operation of the droop control circuit 22. That is, the droop control circuit 22 imparts a droop adjustment to a first one of the output feedback and reference signals, and the amplifier 38 amplifies a difference between that droop-adjusted signal, and the remaining, second one of the output feedback and reference signals.

Because the regulation control circuit 20 in one or more embodiments is itself configured to carry out regulation control based on the difference between the output feedback and reference signals, there may be a desired common mode signal level associated with the regulation control circuit's feedback control inputs. As such, the combining circuit 40 may be used to impart a desired common mode signal level to the error signal generated by the amplifier 38. In one or more embodiments, the desired common mode signal level simply is the level of the regulation control signals, i.e., the level of the reference signal or the output feedback signal, after droop adjustment.

Figure 6:
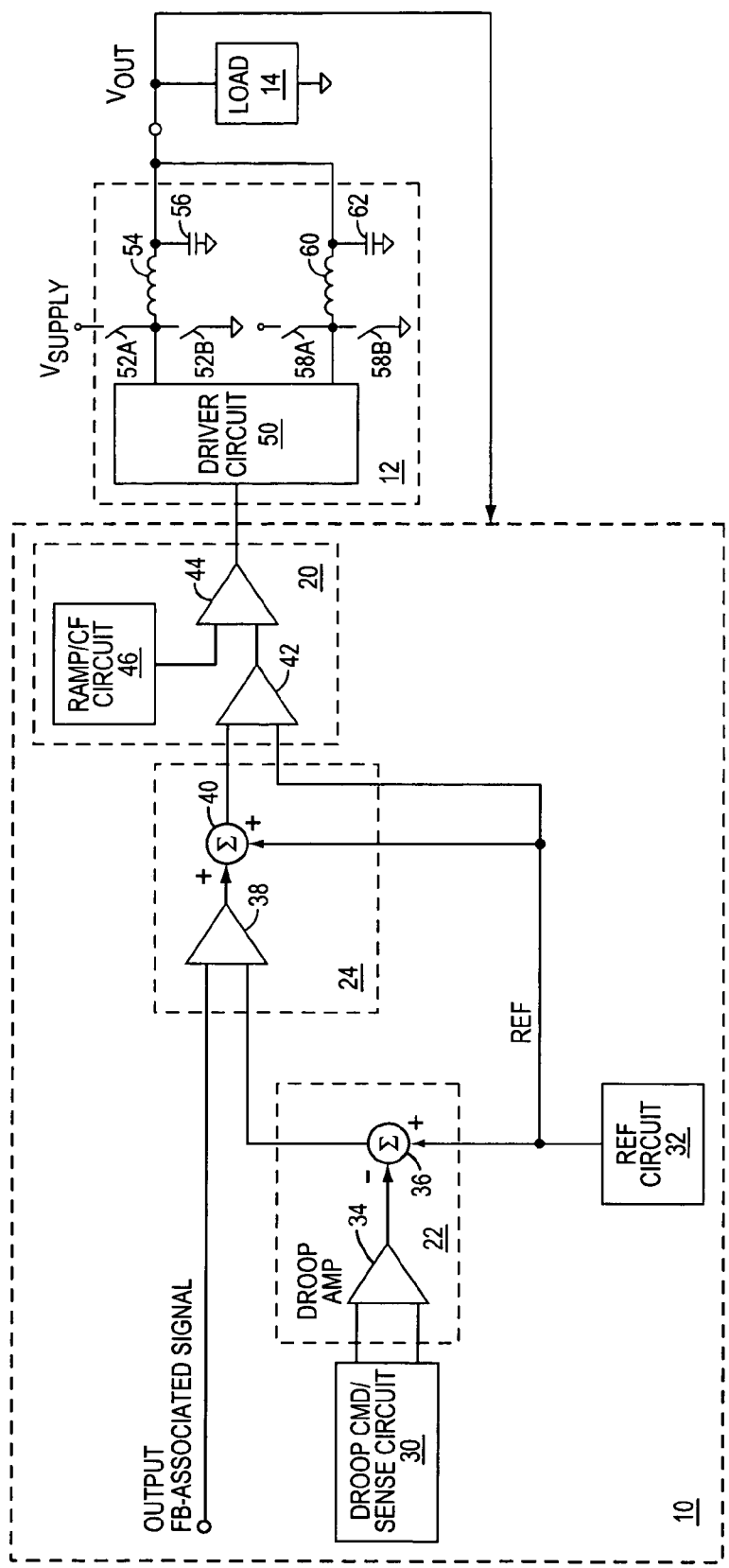

FIG. 4 illustrates the common mode level being established by the droop-adjusted reference signal, while FIG. 6 illustrates the use of reference signal without droop adjustment to establish the common mode. Regardless, the combining circuit 40 may be configured to take the droop-adjusted reference (or output feedback) signal applied to one of the inputs of the amplifier circuit 38, and use that signal to shift the common mode of the amplifier's output error signal to a common mode level for input to the regulation control circuit 20.

Figure 5:
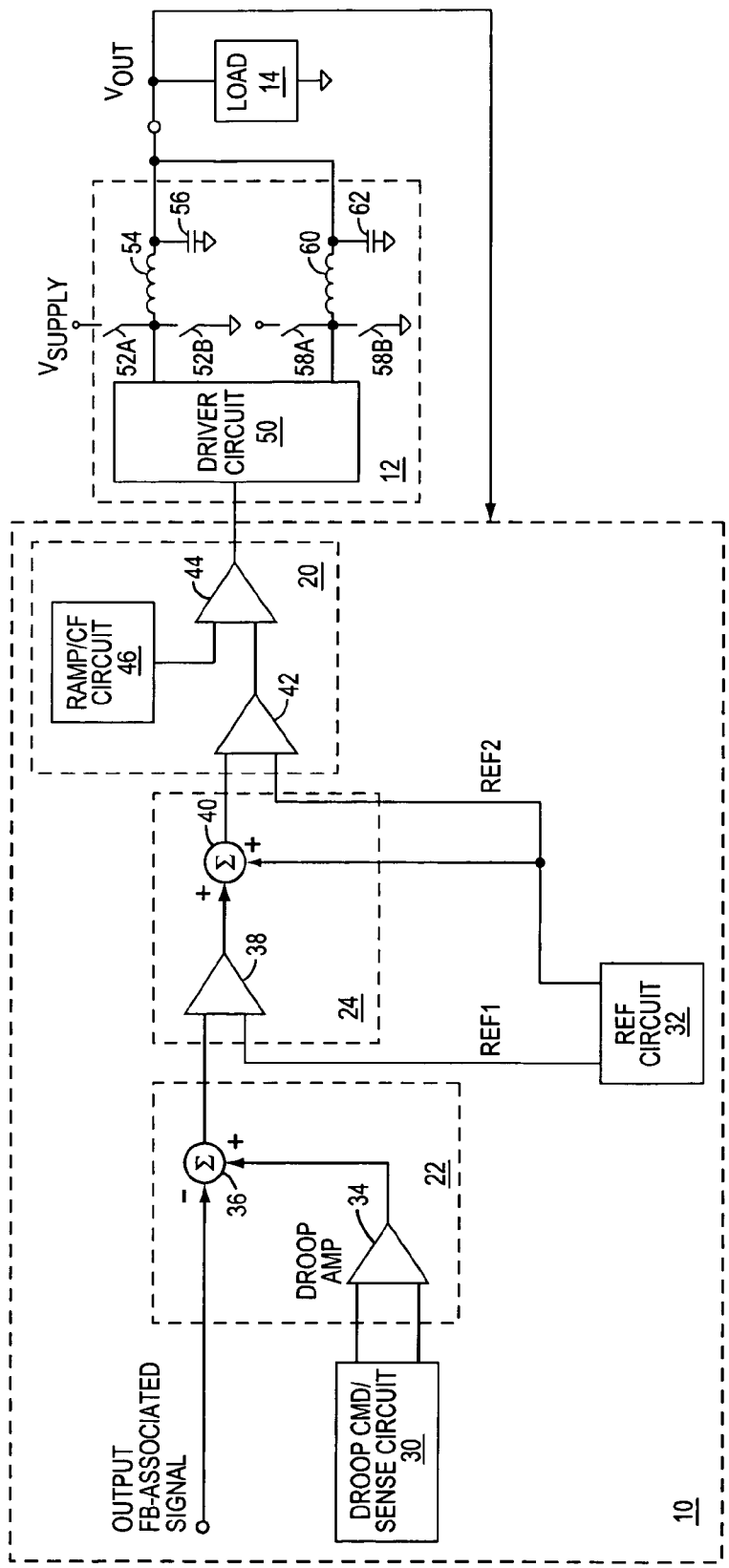

In all of FIGS. 4-6, the regulation control circuit 20 comprises a Pulse Width Modulation (PWM) regulator comprising an error amplifier 42, a PWM comparator 44, and a ramp generator/control circuit 46 to control PWM switching as a function of ramp or other control signal, that may be generated based on current feedback. The error amplifier 42 is configured to generate a regulation error signal for the PWM comparator 44 responsive to error between first and second error amplifier input signals as derived from the output feedback and reference signals. In that context, the response-enhancing amplifier circuit 24 is configured to generate one of said first and second error amplifier input signals by amplifying differences between the output feedback signal and the reference signal, wherein those differences include any droop offsets as introduced by the droop control circuit 22.

More particularly, the output signal from the response-enhancing amplifier circuit 24 serves as one of the error amplifier's inputs, thus making the error sensing function of the error amplifier 42 responsive to the difference amplification of the response-enhancing amplifier circuit 24. Effectively, then, differences between the output feedback signal and the reference signal are amplified twice, once by operation of the response-enhancing amplifier circuit 24, and again by operation of the error amplifier 42.

While this "double" amplification of error, including droop-adjustment error, can significantly improve the transient response of the regulator 10, it can cause regulation control instability absent appropriate configuration of gains, frequency responses, etc. Thus, in one or more embodiments, the gain of the amplifier 38 is set according to one or more regulation control stability criteria. By way of non-limiting example, the gain of the amplifier 38 may be limited to a relatively low value, e.g., a gain of 20 or lower, to avoid over-emphasizing the non-zero regulation control error that typically appears between the reference and output feedback signals. More generally, a too-high gain setting for the amplifier 38 causes undesirable control sensitivity to minor perturbations in the regulation control signals, and thus risks control instability. Of course, the particular gain setting that is appropriate for the amplifier 38 can be determined as a matter of design and/or experimentation, depending upon the particulars of a given regulator application.

The amplifier 38 also may be compensated in terms of its frequency response according to one or more regulation control stability requirements. That is, the amplifier 38 may be tuned for a desired roll-off frequency, or have its frequency response otherwise matched or tuned according to one or more stability considerations. For example, the bandwidth of the amplifier 38 may be limited relative to the regulation control bandwidth of the regulator 10, or it may include filtering to substantially eliminate the switching frequency and harmonics or sub-harmonics of the switching frequency. As with gain compensation, those skilled in the art will appreciate that frequency compensation of the amplifier 38 will be a matter of design choice.

Returning to the regulation control circuit 20, those skilled in the art will appreciate that the arrangement and selection of regulation control circuit elements may be varied from the illustrated embodiments, without departing from the scope of the present invention. Regardless of the arrangement, the PWM switching control signal generated by the PWM comparator 44 varies under closed loop control in response to the sensed regulation error, which includes the amplification effects of the response-enhancing amplifier circuit 24, and that switching control signal is input to a driver circuit 50 for output voltage regulation control.

The driver circuit 50 is illustrated for two output phases, but it should be understood that a greater or lesser number of output voltage phases can be implemented. The driver circuit 50 provides gate drive signals for the switching transistors 52A and 52B associated with a first output phase. Transistors 52A and 52B switch the inductor 54 into and out of electrical connection with a supply voltage ($V_{SUPPLY}$) to generate the first phase of the regulated output voltage $V_{OUT}$, and a capacitor 56 provides output filtering for the first phase. The driver circuit 50 provides similar drive signals for the transistors 58A and 58B, associated with a second output phase. As with the first phase, the second output phase includes a switched inductor 60 and a filter capacitor 62.

It should be understood that some or all of the output switching circuit 12 may comprise part of the regulator 10. For example, the regulator 10 may be implemented as a large-scale integrated circuit device that includes the driver circuit 50 and/or the switching transistors 52A, 52B, 58A, and 58B (or whatever number of switching transistors are needed for the number of output phases). However, such details are not directly relevant to the response-enhancing operations of the response-enhancing amplifier circuit 24.

Figure 7:
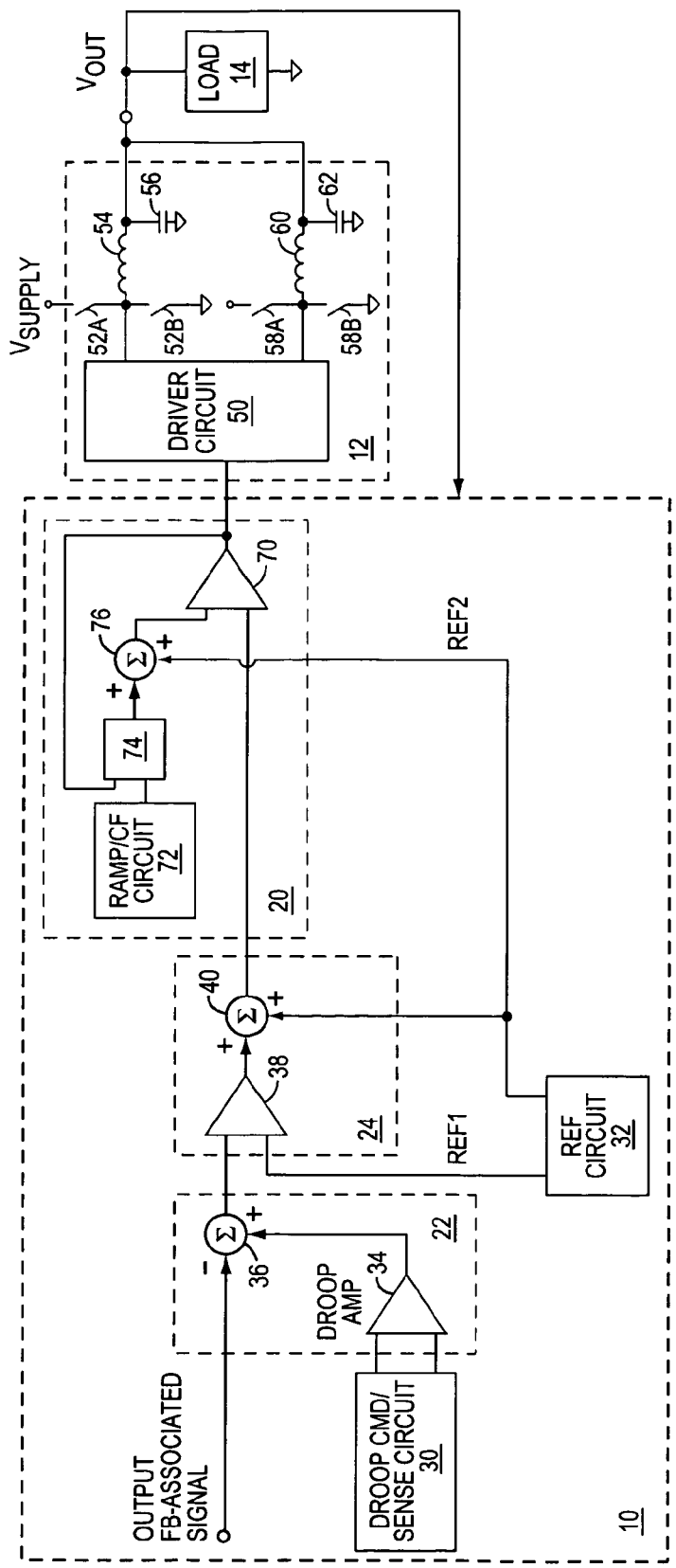
FIGS. 7 and 8 are diagrams of hysteretic voltage regulators with enhanced transient response.

Whether or not it is implemented with the output switching circuit 12 integrated, the topology of the regulator 10 may be selected according to the needs of a particular application. For example, as shown in FIG. 7, the regulation control circuit 20 comprises a hysteretic regulator that includes a hysteretic comparator 70 to generate a hysteretically controlled switching signal for the driver circuit 50, a current feedback circuit 72, a hysteretic offset adjustment circuit 74 to sense the output control state and adjust the hysteretic offset applied to the reference signal by a combining circuit 76.

Figure 8:
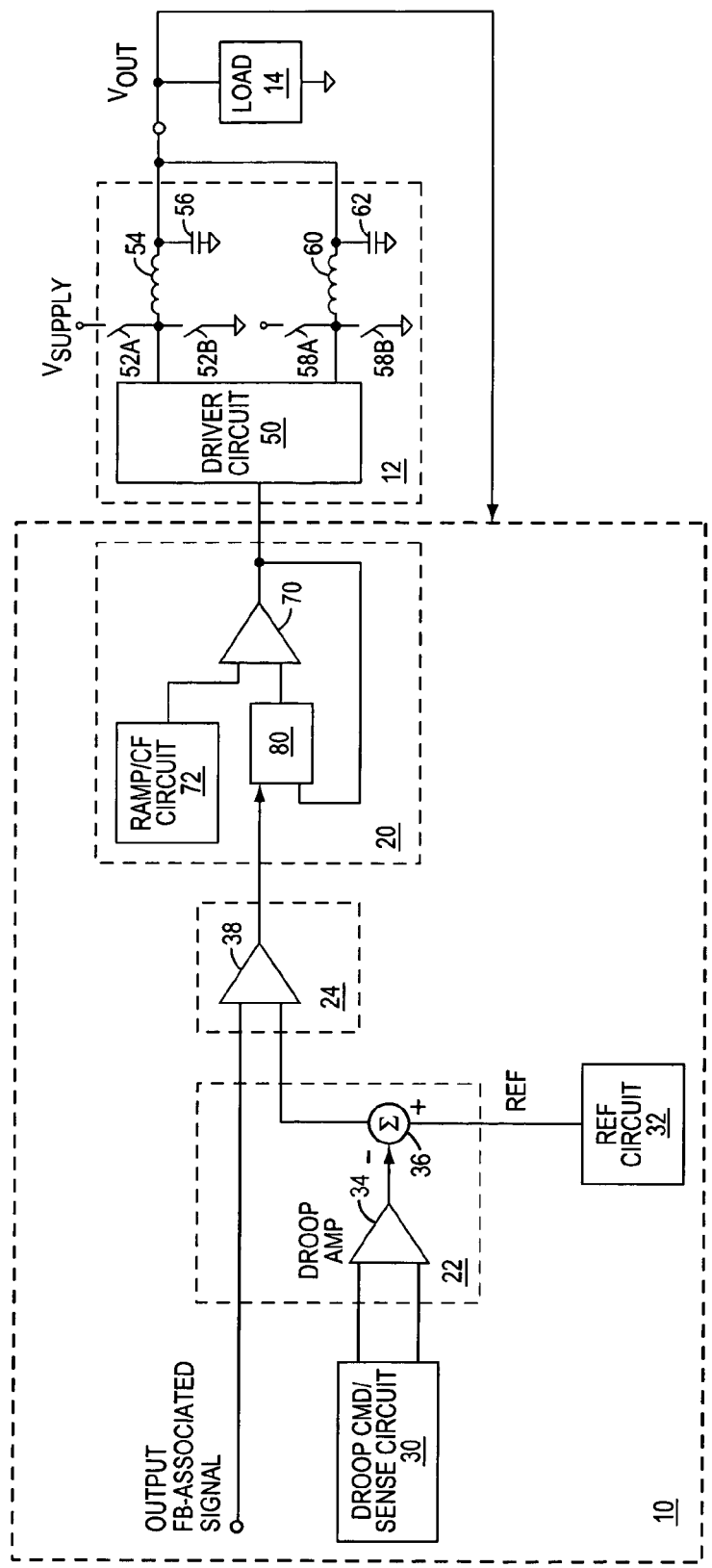

That hysteretically adjusted reference signal serves as one input to the hysteretic comparator 70. The response-enhancing amplifier circuit 24 is configured to generate the other one of the hysteretic comparator's input signals by amplifying differences between the output feedback signal and the reference signal, wherein those differences including any droop offsets as introduced by the droop control circuit. FIG. 8 illustrates another hysteretic control embodiment, but wherein a hysteretic offset adjustment circuit 80 applies the hysteretic offset adjustments to the output from the response-enhancing amplifier circuit 24.

Of course, other topologies may be implemented as needed or desired. Indeed, the present invention is not limited to a particular regulator topology, but broadly encompasses a method of regulating an output voltage by controlling the output voltage based on reducing error between an output feedback signal and a reference signal, wherein the error sensed for control regulation represents an amplification actual error. With that method, the control of the output voltage is made responsive to the amplified regulation error, and the overall transient response of the regulator is thereby improved.

As such, the present invention is not limited by the foregoing discussion, nor is it limited by the accompanying drawings. Instead, the present invention is limited only by the following claims and their legal equivalents.

What is claimed is:

1. A voltage regulator comprising:
    a regulation control circuit configured to regulate an output voltage based on reducing error between an output feedback signal and a reference signal;
    a droop control circuit configured to introduce a droop-related error between the output feedback signal and the reference signal, said droop control circuit comprising a first amplifier configured to generate a droop signal and a first combining circuit configured to add or subtract the droop signal from a first one of the output feedback and reference signals; and
    a response-enhancing amplifier circuit configured to improve a transient response of the voltage regulator by amplifying the error seen by the regulation control circuit, said response-enhancing amplifier circuit comprising a second amplifier configured to generate a first error signal for input to the regulation control circuit based on amplifying a difference between the first one of the output feedback and reference signals and a remaining one of the output feedback and reference signals.

2. The voltage regulator of claim 1, wherein the response-enhancing amplifier circuit further comprises a second combining circuit to add a desired common mode signal to the first error signal, such that the regulation control circuit receives the first error signal at a desired common mode signal level.

3. A voltage regulator comprising:
a regulation control circuit configured to regulate an output voltage based on reducing error between an output feedback signal and a reference signal;
a droop control circuit configured to introduce a droop-related error between the output feedback signal and the reference signal;
a response-enhancing amplifier circuit configured to improve a transient response of the voltage regulator by amplifying the error seen by the regulation control circuit; and
wherein the regulation control circuit comprises a Pulse Width Modulation (PWM) regulator comprising an error amplifier and a PWM comparator, said error amplifier configured to generate a regulation error signal for the PWM comparator responsive to error between first and second error amplifier input signals as derived from the output feedback and reference signals, and wherein said response-enhancing amplifier circuit is configured to generate one of said first and second error amplifier input signals by amplifying differences between the output feedback signal and the reference signal, said differences including any droop offsets as introduced by the droop control circuit.

4. The voltage regulator of claim 1, wherein the regulation control circuit comprises a hysteretic regulator comprising a hysteretic comparator configured to generate a switching control signal responsive to first and second comparator input signals, and wherein said response-enhancing amplifier circuit is configured to generate one of said first and second comparator input signals by amplifying differences between the output feedback signal and the reference signal, said differences including any droop offsets as introduced by the droop control circuit.

5. The voltage regulator of claim 1, wherein the second amplifier of the response-enhancing amplifier circuit is configured with an amplifier gain determined according to one or more regulation stability criteria associated with regulating the output voltage.

6. The voltage regulator of claim 1, wherein the second amplifier of the response-enhancing amplifier circuit is configured with an amplifier frequency response determined according to one or more regulation stability criteria associated with regulating the output voltage.

7. A method of regulating an output voltage comprising:
controlling the output voltage based on reducing error between an output feedback signal and a reference signal;
imparting a desired amount of voltage droop in the output voltage by introducing a droop-related error between the output feedback signal and the reference signal; and
amplifying the error between the output feedback and reference signals, including any droop-related error, for input to an error sensing circuit of a regulation control circuit controlling the output voltage, such that control of the output voltage is made responsive to an amplified error;
wherein amplifying the error between the output feedback and reference signals, including any droop-related error, for input to an error sensing circuit of a regulation control circuit controlling the output voltage comprises amplifying differences between the output feedback signal and the reference signal with a response enhancing amplifier circuit, said differences including any droop-related error introduced by a droop control circuit.

8. The method of claim 7, wherein introducing the droop-related error between the output feedback signal and the reference signal comprises adjusting a droop offset between the output feedback and reference signals according to the desired amount of voltage droop.

9. The method of claim 7, wherein introducing the droop-related error between the output feedback signal and the reference signal comprises generating a droop signal and combining the droop signal with a first one of the output feedback and reference signals.

10. The method of claim 9, wherein amplifying the differences between the output feedback signal and the reference signal with a response enhancing amplifier circuit, said differences including any droop-related error introduced by a droop control circuit, comprises generating an error input signal for input to the error sensing circuit of the regulation control circuit based on amplifying a difference between the first one of the output feedback and reference signals, and a second, remaining one of the output feedback and reference signals.

11. The method of claim 10, further comprising adding a desired common mode signal to the error input signal, such that the error sensing circuit of the regulation control circuit receives the first error signal at a desired common mode signal level.

12. The method of claim 7, wherein the regulation control circuit comprises a Pulse Width Modulation (PWM) regulator including an error amplifier as the error sensing circuit, said error amplifier configured to generate a regulation error signal responsive to error between first and second error amplifier input signals as derived from the output feedback and reference signals, and wherein amplifying the differences between the output feedback signal and the reference signal with a response enhancing amplifier circuit, said differences including any droop-related error introduced by a droop control circuit comprises generating one of said first and second error amplifier input signals by amplifying differences between the output feedback signal and the reference signal, said differences including any droop-related error.

13. The method of claim 7, wherein the regulation control circuit comprises a hysteretic regulator comprising a hysteretic comparator configured to generate a switching control signal responsive to first and second comparator input signals, and wherein amplifying the differences between the output feedback signal and the reference signal with a response enhancing amplifier circuit, said differences including any droop-related error introduced by a droop control circuit, comprises generating one of said first and second comparator input signals by amplifying the differences between the output feedback signal and the reference signal, said differences including any droop-related error.

14. The method of claim 7, further comprising setting an amplifier gain of the response-enhancing amplifier circuit according to one or more regulation stability criteria associated with controlling the output voltage.

15. The method of claim 7, further comprising setting an amplifier frequency response of the response-enhancing amplifier circuit according to one or more regulation stability criteria associated with controlling the output voltage.

* * * * *